US011624839B2

(12) United States Patent
Hua

(10) Patent No.: US 11,624,839 B2
(45) Date of Patent: Apr. 11, 2023

(54) METHOD AND APPARATUS FOR GENERATING AND DISTRIBUTING ORBITAL ELEMENTS FOR ESTIMATIONS OF DOPPLER, ELEVATION, AND PSEUDO-RANGE

(71) Applicant: STAR ALLY INTERNATIONAL LIMITED, Tortola (VG)

(72) Inventor: Wensheng Hua, Fremont, CA (US)

(73) Assignee: STAR ALLY INTERNATIONAL LIMITED, Tortola (VG)

( * ) Notice: Subject to any disclaimer, the term of this patent is extended or adjusted under 35 U.S.C. 154(b) by 658 days.

(21) Appl. No.: 16/721,658

(22) Filed: Dec. 19, 2019

(65) Prior Publication Data

US 2021/0190963 A1  Jun. 24, 2021

(51) Int. Cl.
*G01S 19/08* (2010.01)
*G01S 19/05* (2010.01)

(52) U.S. Cl.
CPC ............. *G01S 19/08* (2013.01); *G01S 19/05* (2013.01)

(58) Field of Classification Search
CPC ...................................................... G01S 19/05
See application file for complete search history.

(56) References Cited

U.S. PATENT DOCUMENTS

| | | |
|---|---|---|
| 6,070,078 A | 5/2000 | Camp, Jr. et al. |
| 6,560,534 B2 * | 5/2003 | Abraham ................ G01S 19/27 701/484 |
| 2008/0024361 A1 * | 1/2008 | Diggelen ............... G01S 19/258 342/357.42 |
| 2008/0191939 A1 | 8/2008 | Yu et al. |
| 2009/0295630 A1 | 12/2009 | Wengler et al. |
| 2014/0070991 A1 * | 3/2014 | Liu ........................ G01S 19/428 342/357.63 |
| 2017/0233112 A1 | 8/2017 | McVicker et al. |
| 2017/0285175 A1 | 10/2017 | Zhang et al. |
| 2017/0289952 A1 * | 10/2017 | Muquet ................ H04J 11/0093 |

(Continued)

FOREIGN PATENT DOCUMENTS

WO  2012151006 A1  11/2012
WO  2019141725 A1  7/2019

OTHER PUBLICATIONS

"PCT Search Report and Written Opinion, PCT/US2020/063645", dated Mar. 11, 2021, 30 pages.

*Primary Examiner* — Cassi J Galt
(74) *Attorney, Agent, or Firm* — Edward C. Kwok; VLP Law Group LLP

(57) ABSTRACT

An ephemeris server performs a method that includes (a) (i) obtaining broadcast ephemeris information by accessing a source of broadcast information on a wide area communication network; (ii) extracting, from broadcast ephemeris information, orbital trajectory information of each satellite, and (iii) creating and storing in a real-time database modified orbital trajectory information for each of the satellites from the extracted orbital trajectory information; (b) at each of a plurality of designated time points, updating the modified trajectory information in the real-time database, based upon evaluation of an update criterion; and (c) providing the modified trajectory information to each of a plurality of devices, each device having a GNSS receiver capable of using the modified trajectory information to process broadcast signals of the satellites.

38 Claims, 2 Drawing Sheets

(56) References Cited

U.S. PATENT DOCUMENTS

2018/0224559 A1    8/2018  Park et al.
2018/0351637 A1   12/2018  Coleman et al.
2019/0353799 A1*  11/2019  Grant ..................... G01S 19/27

* cited by examiner

| Parameter | Length in bits | Value Range | Units |
|---|---|---|---|
| health | 1 | {0, 1} | None |
| week flag | 1 | {0, 1} | None |
| $\dot{\Omega}_e$ flag | 1 | {0, 1} | None |
| week | 10 | {0, ... , 1023} | None |
| $\dot{\Omega}_e$ | 11 | $7.29188323020935 \times 10^{-5} \pm 2^{-26}$ | Radians/sec |
| orbit type | 2 | {0 (MEO), 1 (GSO), 2 (GEO)} | None |
| e | 12 | {[0, 0.0625), [0, 0.0625) + 0.06 for QZSS GSO} | None |
| $\sqrt{A}$ | 13 | {[-8,8) + 5153.68 (GPS), [-8,8) + 5282.61 (BDS MEO), [-8,8) + 5440.61 (GAL), [-8,8) + 6493.38 (GSO), [-8,8) + 6493.43 (GEO)} | $m^{-1/2}$ |
| $\omega$ | 16 | {[-1, 1)} | Semi-circles |
| $M_0$ | 16 | {[-1, 1)} | Semi-circles |
| $\delta\Omega$ | 16 | {[-1, 1)} | Semi-circles |
| $i$ | 12 | {[-1, 1) + 0.3, [-1, 1) + 0.311 (GAL), [-1, 1) + 0.235 (QZSS GSO), [-1, 1) (GEO)} | Semi-circles |
| AF0 | 20 | {(-2, 2)} | Seconds |
| AF1 | 12 | $\{-2^{-26}, 2^{-26}\}$ | Second/second |

*FIG. 2*

| Strategy | Number of Updates | Average Length per Bit Stream |
|---|---|---|
| 1 (at least 5 satellites per bit stream) | 42 | 110 |
| 2 (scale factor = 0) | 30 | 1064 |
| 2 (scale factor = 0.2) | 31 | 510 |
| 2 (scale factor = 0.5) | 46 | 156 |
| 2 (scale factor = 0.8) | 84 | 64 |
| Current | 206 | 22 |

*FIG. 3*

METHOD AND APPARATUS FOR GENERATING AND DISTRIBUTING ORBITAL ELEMENTS FOR ESTIMATIONS OF DOPPLER, ELEVATION, AND PSEUDO-RANGE

BACKGROUND OF THE INVENTION

1. Field of the Invention

The present invention relates to global navigation satellite system (GNSS). The present invention relates to processing and handling of ephermeris data used in position, velocity and time (PVT) determinations using a GNSS.

2. Discussion of the Related Art

To reduce acquisition time, a GNSS receiver is provided a priori information regarding the trajectories of satellites in the GNSS (e.g., positions and velocities; "ephemerides"). For example, such information may be obtained from a terrestrial source or from the navigation message broadcast by each satellite in the GNSS. The ephemeris of the satellite allows a receiver to estimate the elevation, the doppler and the pseudo-range of the satellite at any given time, which enable the receiver to narrow its frequency and delay search spaces for the satellite, when the satellite appears above the receiver's horizon. In that regard, a relatively narrow frequency bin of 200 Hz allows for about 100 Hz doppler estimation error. The provided ephemerides, however, become inaccurate over time, as satellite trajectories are not completely predictable. For a GNSS receiver, as the provided ephemeris of a satellite becomes less accurate, the estimation errors in doppler, pseudo-range and elevation derived from increases. As a result, the time and energy required to acquire and track the satellite may increase over time substantially. Typically, the GNSS updates its broadcast ephemeris information in each satellite's navigation message ("system update") between 1-2 hours.

As among the doppler, the pseudo-range and elevation estimations, a typical medium earth orbit ("MEO") satellite in a GNSS takes around 120 s to fly over 1 degree around center of the earth (i.e., the change in the angle of elevation ("elevation") for the satellite is in the order of ½ degree per minute), so that the estimation error in elevation is relatively less significant. During that time, however, the velocity of the satellite may change 60 m/s (i.e., as much as ~1%), so that the estimation errors in both Doppler and pseudo-range may be significant.

To determine the trajectory of a satellite in the Earth-centered-Earth-fixed (ECEF) coordinate system, six Keplerian orbital elements and the earth's rotation rate ($\dot{\Omega}_e$) are required. The Keplerian orbit elements are: (i) orbital eccentricity (e), (ii) the length of the semi-major axis of the orbit (A), (iii) the angle of inclination at the reference epoch ($i_0$), (iv) the longitude of the ascending node in the orbit plane at the reference epoch ($\Omega_0$), (v) the argument of perigee ($\omega$), and (vi) the mean anomaly at reference epoch ($M_0$).

For the NAVSTAR Global Positioning System ("GPS"), Tables 20-II, 20-III and 20-IV in section 20.3.4 of the publication "NAVSTAR GPS Space Segment/Navigation User Segment Interfaces" (IS-GPS-200D; "Interface Specification") list the definitions, the data formats and compensations for the ECEF coordination system for the ephemeris parameters. Most of these ephemeris parameters are related to Keplerian orbital parameters. In GPS, with the compensations for the ECEF coordinate system, the provided ephemeris parameter values provide the best trajectory fit for each specific fit interval.

The Interface Specification adds the following nine ephemeris parameters: (i) the mean motion difference from computed value ($\Delta n$), (ii) the rate of change of the right ascension ($\dot{\Omega}$), (iii) the rate of change of the angle of inclination (IDOT), (iv) the amplitudes of the sine and cosine harmonic correction terms to the argument of latitude ($c_{us}$, $c_{uc}$), (v) the amplitudes of the sine and cosine harmonic correction terms to the orbital radius ($c_{rs}$, $c_{rc}$), and (vi) the amplitudes of the sine and cosine harmonic correction terms to the angle of inclination ($c_{is}$, $c_{ic}$). These additional ephemeris parameters are referred to as "gravitational harmonic correction terms, rates and rate corrections" to the Keplerian parameters. These additional GPS parameters are also used in China's Beidou system (BDS), Europe's Galileo system (GAL), and Japan's QZSS. In GPS, the navigation message is 1500 bits long and the ephemeris transmitted in it is often valid only for no more than a few days.

In recent years, many applications have been developed for small mobile devices or sensors in which the position of such device is relevant. In many such applications (e.g., "Internet of Things" (IoT) applications), the location of such a device is obtained by an on-board GNSS receiver module. By necessity, IoT devices operate under battery power and communicate uses wireless communication. In fact, in many such applications, the IoT device must operate under very lower power requirements and communicate using long-range, very low data rate wireless communication systems. For these devices,

SUMMARY

According to one embodiment of the present invention, an ephemeris server performs a method for providing ephemeris information of satellites from at least one GNSS. The method includes (a) (i) obtaining broadcast ephemeris information by accessing a source of broadcast information on a wide area communication network; (ii) extracting, from broadcast ephemeris information, orbital trajectory information of each satellite, and (iii) creating and storing in a real-time database modified orbital trajectory information for each of the satellites from the extracted orbital trajectory information; (b) at each of a plurality of designated time points, updating the modified trajectory information in the real-time database, based upon evaluation of an update criterion; and (c) providing the modified trajectory information to each of a plurality of devices, each device having a GNSS receiver capable of using the modified trajectory information to process broadcast signals of the satellites.

The present invention is better understood upon consideration of the detailed description below and the accompanying drawings.

BRIEF DESCRIPTION OF THE DRAWINGS

FIG. 2 is a table showing each field of an LK ephemeris, according to one embodiment of the present invention.

FIG. 3 shows the number of updates and the average length per bit stream from the results of various simulations under strategy 1, strategy 2 or neither strategy ("current strategy"), respectively.

DETAILED DESCRIPTION OF THE PREFERRED EMBODIMENTS

Figure 1:
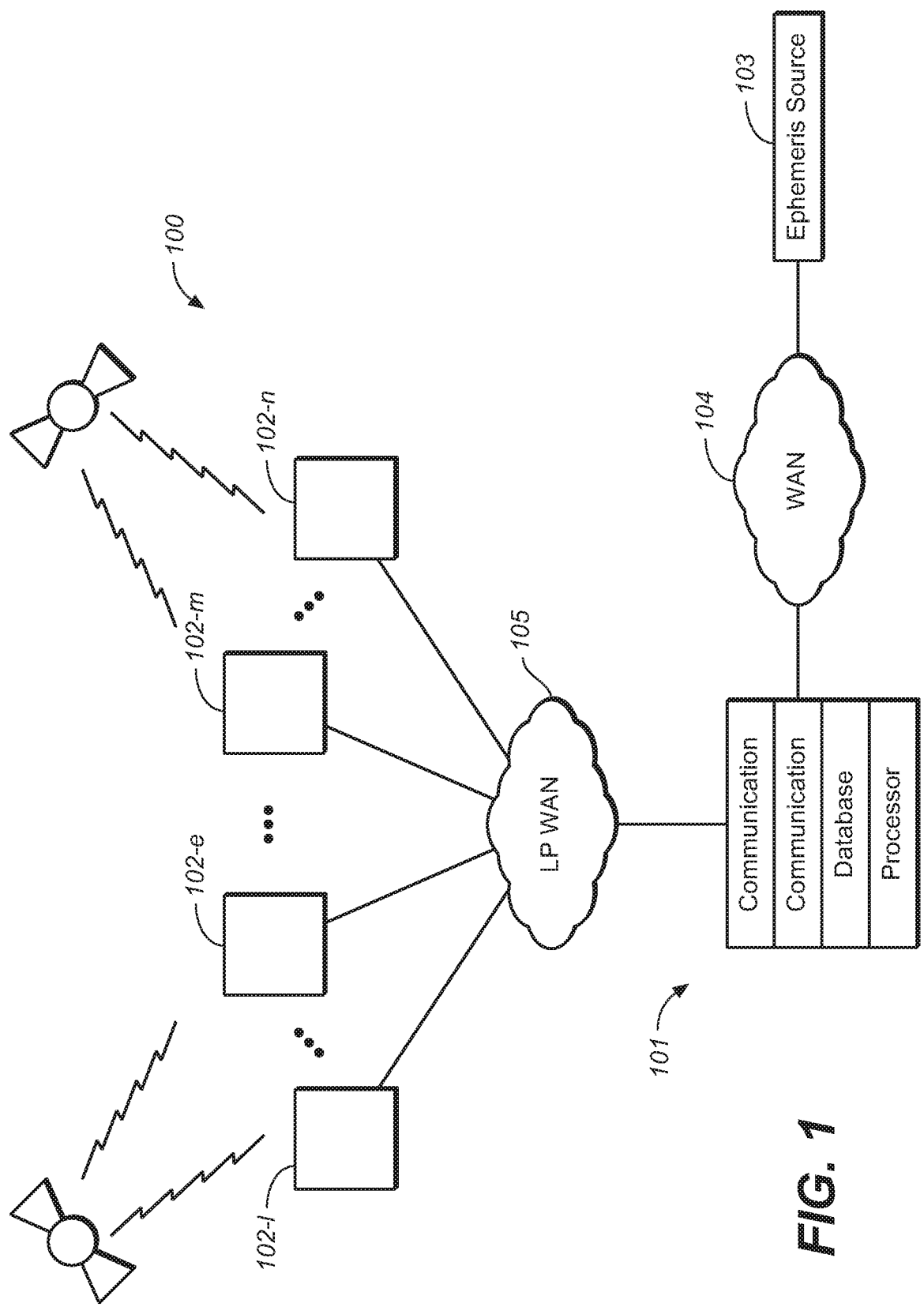
FIG. 1 shows system 100 having ephemeris server 101 and devices 102-1 to 102-*n* each having a GNSS receiver, in accordance with one embodiment of the present invention.

The present invention is illustrated in this detailed description by system 100 of FIG. 1. FIG. 1 shows system 100 having ephemeris server 101 and devices 102-1 to 102-n each having a GNSS receiver, in accordance with one embodiment of the present invention. In system 100, devices 102-1 and 102-n each perform satellite navigation-related activities (e.g., determination of location, velocity or time), satellite ranging-related or any other suitable activities, using its on-board GNSS receiver, but relies on ephemeris server 101 to supply it satellite ephemeris information to facilitate the navigation-related activities. Ephemeris server 101 accesses or receives system updates, for example, from conventional sources 103 (e.g., NASA's CDDIS) over wide area network 104 (e.g., internet). Devices 102-1 to 102-n, some of which may be mobile devices and sensors, communicate with ephemeris server 101 over one or more wide area communication networks 105 (e.g., a low-power wide area network (LPWAN), such as a LoRa-based network). For these devices, power-conservation and efficient use of the low bandwidths are of paramount importance. Therefore, it is highly desired that the ephemeris information supplied by ephemeris server 101 is updated infrequently and each update message should have as few bits as practicable.

As already mentioned above, the duration over which the ephemeris in a system update remains valid depends on the subsequent behavior of the satellite. For high performance applications, the useful life of an ephemeris in a system update may be as short as several hours. The present invention extends the lifespan of a satellite ephemeris used in an on-board GNSS receiver of a low power device by providing such a device selected ephemeris parameter values that are modified to have a longer life-span ("long-lasting Kepler ephemeris" or "LK ephemeris") and are updated in the GNSS receiver upon request or based on one or more performance criteria, rather than whenever a system update is available. For example, ephemeris server 101 may monitor an estimation error in doppler or pseudo-range between the doppler or pseudo-range estimate obtained using the latest system update and the doppler or pseudo-range obtained using the LK ephemeris. Ephemeris server 101 re-evaluates an LK ephemeris only when the monitored quantity exceeds a predetermined threshold ("update criterion").

Typically, the threshold for an estimation error in doppler is set to 100 Hz (i.e., a valid ephemeris is expected to yield an estimation error for doppler that is within ±50 Hz). To reduce communication cost, the LK ephemeris encompasses only selected ephemeris parameters of the system update. Ephemeris server 101 sends the LK ephemerides to each GNSS receiver in a message encoded in an efficient manner.

The inventors observe the following:

(i) perturbations of a satellite's movement do not result in large doppler estimation errors, so that the harmonic terms (i.e., the amplitudes of the sine and cosine harmonic correction terms to the argument of latitude ($c_{us}$, $c_{uc}$), the orbital radius ($c_{rs}$, $c_{rc}$), and the angle of inclination ($c_{is}$, $c_{ic}$)) need not be included in the LK ephemeris.

(ii) the mean motion difference $\Delta n$, the rate of change of the right ascension $\dot{\Omega}$, and the rate of change of the angle of inclination IDOT are related. Three terms rely significantly on the earth's changing rotation rate $\dot{\Omega}_e$ and the tilted polar axis. As the earth's rotation rate $\dot{\Omega}_e$ changes very slowly, its impact on a satellite's orbit is generally not prominent. Therefore, it may not be necessary to include these terms in the transmitted LK ephemeris. For GPS satellites, for example, the GNSS receiver may use IDOT=0 and $\dot{\Omega}_e$=8.15e-9.0, which are good estimates for these terms in some applications.

(iii) The orbital eccentricity e, the angle of inclination at the reference epoch $i_0$, the longitude of the ascending node in the orbit plane at the reference epoch $\Omega_0$, the argument of perigee $\omega$, and the mean anomaly at reference epoch $M_0$ are relatively stable parameters, so that updates to necessitated by these ephemeris parameters are expected to be infrequent.

However, an estimation error in the semi-major axis A—which is a factor that determines a satellite's orbital period—may require expiring the LK ephemeris. In general, the semi-major axis A of a satellite's orbit may be estimated using the equation:

$$n = \sqrt{\frac{\mu}{A^3}} + \Delta n$$

where n is the mean motion of the satellite, $\Delta n$ is the estimation error in the mean motion, and $\mu$ is the earth's gravitational constant. Even for a relatively long time period (e.g., 60 days), mean motion n may be modeled by a linear function in time. When the correlation $|\rho|$ between the mean motion n and a linear function of time exceeds 0.5, and when there are at least 30 days of historical data on mean motion n, an estimate ñ for n may be derived from the equation:

$$\tilde{n} = kt + b$$

where k and b are values that can be derived, for example, from a linear regression of the historical data. When the correlation $|\rho|$ between the mean motion n and a linear function of time does not exceed 0.5, and there are at least 30 days of historical data on mean motion n, then an estimate ñ for n may be provided by the equation:

$$\tilde{n} = \text{mean}(n)$$

The estimate ñ may be used to calculate a correction $\Delta M$ to the mean anomaly $M_0$ of a satellite at reference epoch $t_{ref}$ by the equation:

$$\Delta M = \tilde{n} t - \int_0^{t_{ref}} n(\tau) d\tau$$

An estimate $\Delta t$ of a clock error in a satellite may be obtained using the equation:

$$\Delta t = \frac{\Delta M}{\tilde{n}(t)}$$

An estimate $\Delta \lambda$ for the doppler estimation error may be obtained using the equation:

$$\Delta \lambda = \frac{a \Delta t}{\lambda} \leq \frac{a_{max} \Delta M}{\lambda \tilde{n}(t)}$$

where a is the acceleration of the satellite along the line of sight at time t, and $a_{max}$ is the maximum acceleration of the satellite along the line of sight at time t. To ensure the estimation error for doppler in a GNSS receiver to be within the doppler threshold $(\Delta\lambda)_{max}$ (e.g., 100 Hz), a value for n is obtained by solving the following equation:

$$(\Delta\lambda)_{max} = \left|\frac{a_{max}(\Delta M)_{max}}{\lambda \tilde{n}(t_{max\Delta M})}\right|$$

where $t_{max\ \Delta M}$ is time at which the largest estimation error $(\Delta M)_{max}$ for the mean anomaly $M_0$ occurs.

A long-lasting estimate $\tilde{A}$ of the length of the semi-major axis of a satellite's orbit may then be obtained using the equation:

$$\tilde{A} = \left(\frac{\mu}{\tilde{n}^2}\right)^{1/3}$$

The long-lasting mean anomaly $M_0^{tref}$ at reference epoch $t_{ref}$ may be derived from the mean anomaly $M_0^t$ at the specified time t of the last system update, according to the equation:

$$M_0^{tref} = M_0^t + \tilde{n}(t_{ref} - t)$$

Similarly, the long-lasting longitude $\Omega_0^{tref}$ of the ascending node of the orbit plane is related to the longitude $\Omega_0^t$ of the ascending node of the orbit plane at the specified time t of the last system update according to the equation:

$$\Omega_0^{tref} = \Omega_0^t + \dot{\Omega}(t_{ref} - t) + \dot{\Omega}_e(WN^{tref} - WN^t) \times 604800$$

Where $\dot{\Omega}_e$ is earth's rate of rotation, $WN^{tref}$ and $WN^t$ are the GPS week of the reference epoch and the GPS week of the ephemeris time, respectively.

According to one embodiment of the present invention, only the following ephemeris parameters are prepared by a processor in ephemeris server 101, based on system updates obtained from at least one GNSS, and provided in an ephemeris update from ephemeris server 101: (i) system identification ("system ID"), (ii) satellite identification ("PRN ID", (iii) the estimate $\tilde{A}$ of the length of the semi-major axis of the satellite's orbit, (iv) an estimate $\tilde{e}$ of the orbital eccentricity, (v) an estimated angle of inclination $\tilde{i}_0$ at the reference epoch, (vi) the estimated longitude $\Omega_0^{tref}$ of the ascending node in the orbit plane at the reference epoch, (vii) an estimated argument of perigee $\tilde{\omega}$, and (viii) the mean anomaly $M_0^{tref}$ at the reference epoch. Items (iii)-(iv) collectively constitute one instance of an LK ephemeris. As shown in below, a GNSS receiver can estimate elevation, pseudo-range and doppler within reasonable predetermined thresholds (e.g., a 100 Hz doppler threshold and a 250-microsecond delay threshold) using only these LK ephemerides over extended time periods (e.g., weeks), thus avoiding frequent updates to the GNSS receiver.

In theory, if the reference epoch is known to both ephemeris server 101 and the GNSS receiver, ephemeris server 101 need not provide the ephemeris time of each LK ephemeris to the GNSS receiver. However, in practice, the reference epoch is preferably expressly provided, as quantization errors may accumulate. In one embodiment, ephemeris server 101 provides at least the GPS week of the reference epoch to the GNSS receivers.

In one embodiment, ephemeris server 101 may monitor an estimated pseudo-range $\tilde{r}$. For example, in GPS, the C/A code has 1023 chips transmitted over 1 millisecond. Thus, with a pseudo-range prediction threshold of 0.25 ms, the code delay is expected to be within a range spanning ¼ of the 1023 possible delays. In general, like a 100 Hz doppler threshold for an MEO satellite, a 0.25 ms pseudo-range prediction threshold provides a period of validity in the order of months. In that situation, the LK ephemerides generated by a method of the present invention provide suitable pseudo-range estimations. However, with a lesser pseudo-range prediction threshold (e.g., 0.02 ms), the period of validity would be much shorter (e.g., in the order days). For this reduced period of validity, the historical data-based length estimation $\tilde{A}$ for the orbital semi-major axis may be unsuitable. In that case, however, the square of ephemeris parameter $\sqrt{A}$ from the most recent system update may be used in the LK ephemeris as the length estimation $\tilde{A}$. A pseudo-range estimation that is 10 km or longer should also include the contributions of the satellite clock bias (AF0) and the clock drift (AF1).

The elevation, pseudo-range and doppler estimations that are based on an LK ephemeris inevitably deteriorate over time, as the trajectory of a GNSS satellite is not completely predictable. Therefore, according to one embodiment of the present invention, ephemeris server 101 monitors these predictions. When the estimation error in doppler or pseudo-range exceeds the corresponding preset threshold for a satellite, ephemeris server 101 updates its LK ephemeris for that satellite.

To support its activities, Ephemeris server 101 maintains a real-time database of LK ephemerides organized as "snapshots." Each snapshot corresponds to the set of most recently generated LK ephemerides for the satellites supported by ephemeris server 101. (The supported satellites may be selected from more than one GNSS). In one embodiment, a GNSS receiver may request for the most recent snapshot relative to a specified time. (The specified time may be expressed, for example, as a UTC time.) A GNSS receiver may also request a bit stream that encodes an update from a specified snapshot (presumably, the snapshot currently implemented in the GNSS receiver) to the most recent snapshot.

In one embodiment, each snapshot is tagged with a timestamp. Similarly, each LK ephemeris is also tagged with a timestamp in the form of a sequence number. The sequence number may be an integer t that is incremented by 1 at each reevaluation time (e.g., every UTC hour), beginning from a time of initialization (e.g., t=0 at 00:15 on Jan. 1, 2017). These sequence numbers therefore label successive epochs of one UTC hour. In this description, the snapshot at time t is denoted s(t), and an LK ephemeris for satellite j (j=1, . . . , n) created at time t is denoted keph(j,t). Initially, i.e., at the time of initialization, ephemeris server 101 creates snapshot s(0) from the most recent system updates of all monitored satellites. Thus, snapshot s(0) includes LK ephemerides keph(0,0), keph(1,0), . . . , keph(n,0).

At the next reevaluation time point (i.e., t=1), ephemeris server 101 determines which of the LK ephemerides keph(0, 0), keph(1, 0), . . . , keph(n,0) within snapshot s(0) require an update, based on evaluating the update criterion for each satellite. Ephemeris server 101 creates a new LK ephemeris only when the update criterion is satisfied. For example, at time t=1, if LK ephemerides keph(0,0) and keph(25,0) require updating, ephemeris server 101 creates LK ephemerides keph(0,1) and keph(25,1). Ephemeris server 101 creates a new snapshot at an reevaluation time point only when at least one LK ephemeris requires an update. Thus, snapshot s(1) includes LK ephemerides keph(0,1), keph(1, 0), keph(24,0), keph(25,1), keph(26,0), . . . , keph(n,0). Had none of the long-time Kepler ephemerides in snapshot s(0), ephemeris server 101 would not create snapshot s(1). This set of action is repeated at every reevaluation time point.

Note that, in this embodiment, both snapshots and LK ephemerides are indexed by their respective creation times.

As explained above, the update criterion evaluates the difference in magnitude between the estimated pseudo-range doppler or elevation obtained using the latest system update and the corresponding estimated pseudo-range doppler or elevation obtained using the LK ephemeris. The update criterion is satisfied when the difference exceeds a preset threshold. In one embodiment, at each reevaluation time point, ephemeris server 101 examines this update criterion for each satellite under monitor at each of about 100 locations distributed around the world. A new LK ephemeris of a satellite is created when the update criterion for the satellite is satisfied at one or more of the 100 locations.

However, given the limited bandwidth of devices 102-1 and 102-n, each device receives an update to its on-board LK ephemerides only when it requests the update from ephemeris server 101. To reduce the number of terms used in this detailed description, the collection of LK ephemerides in a device is also referred to as a "snapshot". In some embodiments, because activities are not coordinated among the ephemeris server and the devices in system 100 (e.g., the server may restore into the current snapshot a previous ephemeris, for any of a number of reasons, as discussed below), the sequence number of an LK ephemeris on the ephemeris server may be less than the sequence number of the corresponding LK ephemeris in a device. In that case, even though a snapshot on ephemeris server 101 and a snapshot on a device have the same sequence number, the snapshots need not have the same collection of LK ephemerides.

With its update request, a device sends ephemeris server 101 the timestamp (i.e., the sequence number) associated with its last snapshot. Ephemeris server 101 then compares the received sequence number to the sequence number of each LK ephemerides in its current snapshot. Those ephemerides in ephemeris server 101's current snapshot having a sequence number greater than the received sequence number are designated for the requested update. Based on this comparison, ephemeris server 101 creates and sends to the requesting device a bit stream that update those designated ephemerides. For example, suppose a device sends an update request at time t=27, when its snapshot s(25) includes LK ephemerides keph(0, 24), keph(1, 24), keph(24, 24), keph(25, 24), keph(26,24), . . . , keph(n,24), while ephemeris server 101 has current snapshot s(27), which includes LK ephemerides keph(0,24), keph(1,24), keph(24,24), keph(25, 27), keph(26,23), . . . , keph(n,24). The device's update request, therefore, includes sequence number 25. Upon receiving the update request, ephemeris server 101 determines that only LK ephemeris keph(25,27) in its current snapshot s(27) has a sequence number greater than the sequence number in the update request. Accordingly, the device requires a bit stream that updates only LK ephemeris keph(25,24) to keph(25,27). Using the bit stream, the device creates its snapshot s(27), which includes LK ephemerides keph(0, 24), keph(1, 24), keph(24, 24), keph(25, 27), keph(26,24), . . . , keph(n,24).

In ephemeris server 101, the sequence number may have any suitable bit-length (e.g., 29 bits, as in GPS time). However, in some embodiments, because of the limited communication bandwidth and other reasons, the sequence number in some of devices 102-1 to 102-n may be implemented with a shorter bit-length that the sequence number in ephemeris server 101. Naturally, the sequence number in such a device "rolls over" more frequently than the sequence number in ephemeris server 101. In other words, the sequence number on the device should be treated as a modulo-$2^m$ integer, where m is the bit length. When comparing the sequence number of an LK ephemeris in its snapshot (say, A) with the sequence number in an update request (say, B), ephemeris server 101 expresses B as the shorter of the directed distances from 0 modulo-$2^m$. Specifically, B is mapped to C, which takes value B, when B<$2^{m-1}$, and which takes value ($2^{m-1}$-B), otherwise. The sequence number of an LK ephemeris in ephemeris server 101's snapshot is greater the sequence number in the update request when (A−C)>0.

From time to time, ephemeris server 101 may need to be reset to recover from a disruption of service. In a recovery, one may initialize a new server—regenerating all the LK ephemerides—to replace the server that is taken out of service. Such an approach would be impractical, as it would result in the GNSS receivers of devices 102-1 to 102-n update all their snapshots, as the sequence numbers of practically all the LK ephemerides in the new server's snapshot would be greater than those in the devices' snapshots. The resulting workload would overwhelm the communication bandwidth of system 100.

The present invention provides recovery processes that are quick and cost-effective. In some embodiments, the real-time database of ephemeris server 101 may be recoverable from an off-site archive. When an archived database is restored, the recovery process regenerates the restored LK ephemerides that are no longer valid. With a short service interruption, the bandwidth required to service the subsequent update requests from devices 102-1 to 102-n may be quite acceptable. For example, service interruption is minimum when the snapshot of the current epoch can be restored from archive and the restoration is complete before the next epoch (i.e., the next UTC hourly re-evaluation time point).

According to one embodiment of the present invention, ephemeris server tot also records the time of each system update, if that system update is used to generate an LK ephemeris. In that approach, even when one or more snapshots are lost (either unrecoverable or because the service interruption spans one or more re-evaluation time points), all the snapshots subsequent to the restored snapshot, but prior to the service interruption, may be recreated. For the snapshots lost during the service interruption, they can be recreated using all the system updates that occurred during the time of interruption, such system updates being available from sources external to system too.

According to one embodiment of the present invention, ephemeris server tot may also recover by generation a special snapshot ("referenced snapshot") from previous system updates (e.g., those current at 24 UTC hours prior to the service interruption). LK ephemerides from the reference snapshot are not used to update LK ephemerides of devices 102-1 to 102-n. For example, at time t=$\hat{t}$, reference snapshot s(*) is created from previous system updates, including LK ephemerides keph(0,*), keph(1,*), . . . , keph(n,*). Thereafter, at t=$\hat{t}$+p, i.e., p re-evaluation time points later, satisfying their respective update criteria, LK ephemerides keph(25,*), keph(26,*) are updated, so that snapshot s($\hat{t}$+p) includes LK ephemerides keph(0,*), keph(1,*), . . . , keph(24,*), keph(25, $\hat{t}$+p), keph(26, $\hat{t}$+p), . . . , keph(n,*). During epoch t=$\hat{t}$+p, update requests received at ephemeris may result in LK ephemerides of satellites 25 and 26 to be updated in requesting devices. The remaining LK ephemerides are replaced in the normal course—according to their respective update criteria—in subsequent re-evaluation time points and made available for updating the corresponding LK ephemerides in devices 101-1 to 101-n. In this manner, the limited bandwidth due to service recovery is not overwhelmed. In some embodiments, rather than choosing the system updates current at one reference time for all the LK ephemerides of the reference snapshot, a different reference time—perhaps randomly selected—may be used to generate the LK ephemeris for each satellite.

Admittedly, the recovery methods under the present invention may result in degraded performance in some of devices 102-1 to 102-n. For example, a device may have to use an expired LK ephemeris until the corresponding LK ephemeris from the reference snapshot is replaced in the normal course. However, the recovery method of the present invention ensure system 101 recover gracefully over time.

According to one embodiment of the present invention, the bit stream for an LK ephemerides update has a header portion and a body portion. The header portion includes a 15-bit "issue of data, ephemeris (IODE)", and a identification string (SID) listing the satellites whose LK ephemerides are updated. The IODE includes the sequence number of the update. The SID includes four 1-bit GNSS identification flags, showing (in order) GPS, BDS, GAL and QZSS. If only one of the four GNSS identification flags is set, the next 8-bit word is an index into a list of the satellites in the identified constellation. Otherwise, the satellite flag map of each GNSS with LK ephemerides included follow, in the order of the GNSS identification flags. If the GPS flag is set, its satellite map includes 31 flags, each set flag representing one satellite whose LK ephemeris is included. The satellites are represented in order of their pseudo-random number code index ("PRN ID"). Likewise, for BDS, GAL and QZSS, their respective satellite flag maps have 37 bits, 36 bits and 8 bits, respectively.

The bit stream's body is consecutive listing of the LK ephemerides (i.e., orbital and clock parameter values), according to the order of the set flags in satellite flag maps in the header. FIG. 2 is a table showing each field of an LK ephemeris, according to one embodiment of the present invention. Note that, when the "week flag" or the "$\dot{\Omega}_e$ flag" is not set, their corresponding "week" field or "$\dot{\Omega}_e$" field does not appear in the bit stream. In some embodiments, the "orbit type" field is omitted, as the orbit type (i.e., MEO, GEO or GSO) for any of the identified satellites is already known.

In some embodiments, ephemeris server 101 determines whether or not to set the health flag in an LK ephemeris, so as to control the frequency of updates.

In some embodiments, a current snapshot is pre-installed in each GNSS receiver before it is released to operation. A current snapshot may also be installed in each GNSS receiver upon beginning operation in system 101.

The format of each LK ephemeris (e.g., the fields and their respective bit-lengths) may be determined empirically. According to one embodiment, 365 UTC days of actual system updates are collected and used in a simulation. The data for the first 70 days is used to tune the bit-lengths of each field in LK ephemeris. For example, a longer bit-length provides a higher precision in a Kepler parameter value. The more sensitivity of an update criterion to that Kepler parameter, a longer bit-length is required. Because of the number of parameters in the LK ephemeris, tuning the format of an LK ephemeris to obtain a desirable bit-length and a high performance (i.e., requiring relatively infrequent updates) may require significant amount of trial and error manipulation, as well as educated guesses.

After a desirable LK ephemeris format is obtained, the data of the remaining 295 UTC days are used with 31 satellites. The ephemeris updates their LK ephemerides according to the one embodiment of the present invention, as described above. Every 1200 UTC seconds, the ephemeris server evaluates the doppler update criteria for all the satellites at 100 randomly selected locations around the globe. In this simulation, the doppler criterion for each satellite is a 90 Hz threshold. When the threshold is exceeded in any of the update criteria evaluated, an LK ephemeris is generated for the next snapshot.

In one 365 UTC day simulation using the LK ephemeris format of FIG. 2, some LK ephemerides did not expire. The most frequently updated satellite has 3 updates. In total 41 updates were required for the last 295 UTC day duration of the simulation.

In a second simulation, 500 UTC days of system updates and different pseudo-range update criteria are used. The results were consistent with the hypothesis that a higher update frequency results from a narrower pseudo-range threshold (e.g., 0.25 ms vs. 0.02 ms). In that simulation, a doppler threshold of 50 Hz was used, which did not appear to materially affect the pseudo-range performance (That is, increasing the 50 Hz threshold did not materially reduce the update frequencies under each pseudo-range threshold.)

In one embodiment ("Strategy 1"), the ephemeris server 101 does not send a bit stream for update, unless the number of LK ephemeris included in the bit stream exceeds a predetermined number (e.g., 5).

In another embodiment ("strategy 2"), a wide pseudo-range threshold and a narrow pseudo-range threshold are monitored simultaneously, with the narrow pseudo-range threshold being a product of the wide pseudo-range threshold and a scale factor less than 1.0. In this approach, when the update criterion based on the wide pseudo-range threshold is satisfied for any satellite, the LK ephemerides are updated for the satellites satisfying their update criteria based on their narrow pseudo-range thresholds. FIG. 3 shows the number of updates and the average length per bit stream from the results of various simulations under strategy 1, strategy 2 or neither strategy ("current strategy"), respectively. Under strategy 2, various scale factors were simulated. The simulation were conducting using ephemeris data from 56 satellites from GPS, GAL, BDS and QZSS.

The above detailed description is provided to illustrate specific embodiments of the present invention and is not intended to be limiting. Numerous variations and modifications within the scope of the present invention are possible. The present invention is set forth in the accompanying claims.

I claim:

1. An ephemeris information server, comprising:
    a processor;
    a first communication interface with a wide area network;
    a second communication interface; and
    a real-time database, wherein the processor (a) (i) obtains broadcast ephemeris information by accessing a source of broadcast information on the wide area communication network using the first communication interface, the broadcast ephemeris information relating to satellites in at least one GNSS; (ii) extracts, from broadcast ephemeris information, orbital trajectory information of each satellite, and (iii) creates and stores in the real-time database modified orbital trajectory information for each of the satellites from the extracted orbital trajectory information; (b) at each of a plurality of designated time points, updates the modified trajectory information in the real-time database, based upon evaluation of an update criterion that is based on an estimation error between a parameter value computed using the broadcast ephemeris information and the parameter value computed using the modified trajectory information; and (c) provides the modified trajectory information to each of a plurality of devices over the second communication interface, each device having a GNSS receiver capable of using the modified trajectory information to process broadcast signals of the satellites.

2. The ephemeris server of claim 1, wherein the modified trajectory information is provided to the devices on demand.

3. The ephemeris server of claim 1, wherein the second communication interface accesses a wide-area, low-power communication network (LPWAN).

4. The ephemeris server of claim 3, wherein the LPWAN is LoRa based.

5. The ephemeris server of claim 1, wherein the parameter value computed is one or more of: elevation, pseudo-range and doppler.

6. The ephemeris server of claim 1, wherein the modified trajectory information for each satellite is not updated when the update criterion is not satisfied.

7. The ephemeris server of claim 1, wherein the modified trajectory information includes Kepler ephemeris information of each of the satellites.

8. The ephemeris server of claim 7, wherein the Kepler ephemeris information includes an estimate of a semi-major axis of one of the satellites.

9. The ephemeris server of claim 8, wherein the semi-major axis is estimated using a mean motion of the satellite.

10. The ephemeris server of claim 9, wherein the mean motion is modeled by a linear function of time.

11. The ephemeris server of claim 7, wherein the Kepler ephemeris information comprise a parameter value related to a mean anomaly of an orbit of one of the satellites.

12. The ephemeris server of claim 7, wherein the Kepler ephemeris information further comprises an estimate of a longitude of an ascending node associated with an orbital plane of one of the satellites.

13. The ephemeris server of claim 1, wherein the modified trajectory information is communicated to one of the devices in a bit stream related only to modified trajectory information not already in possession by the device.

14. The ephemeris server of claim 13, wherein the bit stream includes modified trajectory information of two or more satellites.

15. The ephemeris server of claim 1, wherein the update criterion includes a first performance criterion and a second performance criterion, wherein (i) at each designated time point, only when at least one of the satellites satisfies the first performance criterion does the update criterion deemed satisfied, and (ii) upon the update criterion deemed satisfied, the modified trajectory information of those of the satellites satisfying the second performance criterion are updated.

16. The ephemeris server of claim 1, wherein the designated time points occur at regular time intervals.

17. The ephemeris server of claim 1, wherein copies of the real-time database at different times are stored away at one or more locations away from the ephemeris server, thereby enabling the ephemeris server to be restored to a previous state.

18. The ephemeris server of claim 17, wherein the ephemeris server further records in the real-time database the time of creation associated with each instance of creation of modified trajectory information, so as to allow restoring the real-time database to a desired state subsequent to the previous state.

19. The ephemeris server of claim 18, wherein the ephemeris server restores the real-time database by creating modified trajectory information current at a selected previous time as a reference set of modified trajectory information and wherein the modified trajectory information in the reference set is provided to the devices only after such modified trajectory information is updated subsequent to the selected previous time.

20. A method for providing ephemeris information of satellites from at least one GNSS, comprising, in an ephemeris server:
(a) (i) obtaining broadcast ephemeris information by accessing a source of broadcast information on a wide area communication network; (ii) extracting, from broadcast ephemeris information, orbital trajectory information of each satellite, and (iii) creating and storing in a real-time database modified orbital trajectory information for each of the satellites from the extracted orbital trajectory information;
(b) at each of a plurality of designated time points, updating the modified trajectory information in the real-time database, based upon evaluation of an update criterion that is based on an estimation error between a parameter value computed using the broadcast ephemeris information and the parameter value computed using the modified trajectory information; and
(c) providing the modified trajectory information to each of a plurality of devices, each device having a GNSS receiver capable of using the modified trajectory information to process broadcast signals of the satellites.

21. The method of claim 20, wherein the modified trajectory information is provided to the devices on demand.

22. The method of claim 20, wherein the devices and the ephemeris server communicate over a wide-area, low-power communication network (LPWAN).

23. The method of claim 22, wherein the LPWAN is LoRa based.

24. The method of claim 20, wherein the parameter value computed is one or more of: elevation, pseudo-range and doppler.

25. The method of claim 20, wherein the modified trajectory information for each satellite is not updated when the update criterion is not satisfied.

26. The method of claim 20, wherein the modified trajectory information includes Kepler ephemeris information of each of the satellites.

27. The method of claim 26, wherein the Kepler ephemeris information includes an estimate of a semi-major axis of one of the satellites.

28. The method of claim 27, wherein the semi-major axis is estimated using a mean motion of the satellite.

29. The method of claim 28, wherein the mean motion is modeled by a linear function of time.

30. The method of claim 26, wherein the Kepler ephemeris information comprise a parameter value related to a mean anomaly of an orbit of one of the satellites.

31. The method of claim 26, wherein the Kepler ephemeris information further comprises an estimate of a longitude of an ascending node associated with an orbital plane of one of the satellites.

32. The method of claim 20, wherein the modified trajectory information is communicated to one of the devices in a bit stream related only to modified trajectory information not already in possession by the device.

33. The method of claim 32, wherein the bit stream includes modified trajectory information of two or more satellites.

34. The method of claim 20, wherein the update criterion includes a first performance criterion and a second performance criterion, wherein (i) at each designated time point, only when at least one of the satellites satisfies the first performance criterion does the update criterion deemed satisfied, and (ii) upon the update criterion deemed satisfied, the modified trajectory information of those of the satellites satisfying the second performance criterion are updated.

35. The method of claim 20, wherein the designated time points occur at regular time intervals.

36. The method of claim 20, wherein copies of the real-time database at different times are stored away at one or more locations away from the ephemeris server, thereby enabling the ephemeris server to be restored to a previous state.

37. The method of claim 36, wherein the ephemeris server further records in the real-time database based the time of creation associated with each instance of creation of modified trajectory information, so as to allow restoring the real-time database to a desired state subsequent to the previous state.

38. The method of claim 37, wherein the ephemeris server restores the real-time database by creating modified trajectory information current at a selected previous time as a reference set of modified trajectory information and wherein the modified trajectory information in the reference set is provided to the devices only after such modified trajectory information is updated subsequent to the selected previous time.

* * * * *